United States Patent
Lee et al.

[11] Patent Number: 5,888,317
[45] Date of Patent: Mar. 30, 1999

[54] HYDROGEN-STORAGE MATERIAL EMPLOYING TI-MN ALLOY SYSTEM

[75] Inventors: Jai-Young Lee, Taejon; Ki-Young Lee; Han-Ho Lee, both of Seoul; Dong-Myung Kim, Kyonggi-Do; Ji-Sang Yu, Seoul; Jae-Han Jung; Soo-Geun Lee, both of Taejon, all of Rep. of Korea

[73] Assignee: Korea Advanced Institute of Science and Technology, Taejon, Rep. of Korea

[21] Appl. No.: 640,023

[22] Filed: Apr. 30, 1996

[30] Foreign Application Priority Data

Apr. 28, 1995 [KR] Rep. of Korea .................. 1995-10384

[51] Int. Cl.$^6$ .................................................. C22C 22/00
[52] U.S. Cl. ........................... 148/424; 148/442; 420/434; 420/583; 420/588; 420/900
[58] Field of Search ..................... 148/421, 424, 148/442; 420/421, 420, 434, 583, 588, 900

[56] References Cited

U.S. PATENT DOCUMENTS

| 3,615,378 | 10/1971 | Bomberger et al. .................... 148/421 |
| 4,114,103 | 9/1978 | Gamo et al. . |
| 4,153,484 | 5/1979 | Gamo et al. . |
| 4,160,014 | 7/1979 | Gamo et al. . |
| 4,370,163 | 1/1983 | Moriwaki et al. ....................... 420/583 |

FOREIGN PATENT DOCUMENTS 3151712   6/1984   Germany ............................. 420/421

OTHER PUBLICATIONS

H. Sawa et al. "Effects of Oxidation Treatment of Ti–Zr–Ni Hydride Electrodes...", *Zeitschrift für Physikalische Chemie Neue Folge*, 164:1527–1532 (1989).
S. Wakao et al. "Effects of Partial Substitution and Anodic Oxidation Treatment..." *Journal of the Less–Common Metals*, 172–174:1219–1226 (1991).
T. Gamo et al., "Formation and Properties of Titanium–Manganese Alloy Hydrides", *Int. J. Hydrogen Energy*, 10(1):39–47 (1985).
Soo–Ryoung Kim & Jai–Young Lee, "Activation Behaviour of $ZrCrNiM_{0.05}$ Metal Hydrides", *Journal of Alloys and Compounds*, 185:L1–L4 (1992).

*Primary Examiner*—John Sheehan
*Attorney, Agent, or Firm*—Darby & Darby

[57] ABSTRACT

The present invention relates to a material for hydrogen-storage constituted by Ti-Mn alloy system which has a high hydrogen-storage capacity, plateau hydrogen dissociation equilibrium pressure, hypostoichiometric composition and crystal structure of C14. Ti-Mn alloy system for hydrogen-storage of the invention which has a C14 crystal structure, is represented as: $Ti_u Zr_v Mn_w Cr_x V_y X_z$, wherein, X is at least one of element selected from the group consisting of Fe, Al and Ni; u, v, w, x, y and z are mole numbers of each components; $0.7 < u < 1.0$; $0 < v < 0.3$; $1.0 \leq w \leq 1.3$; $0.1 \leq x \leq 0.4$; $0 < y < 0.3$; $0 \leq z \leq 0.2$; $0.7 < u+v < 1.0$; $1.4 \leq w+x \leq 1.7$; and, $1.3 \leq w+x+y+z < 2.0$.

4 Claims, 10 Drawing Sheets

HYDROGEN-STORAGE MATERIAL EMPLOYING TI-MN ALLOY SYSTEM

FIELD OF THE INVENTION

The present invention relates to a hydrogen-storage material employing Ti-Mn alloy system, more specifically, to a material for hydrogen-storage constituted by Ti-Mn alloy system which has a high hydrogen-storage capacity, a proper plateau hydrogen dissociation equilibrium pressure, hypostoichiometric composition and crystal structure of C14.

BACKGROUND OF THE INVENTION

Conventionally, hydrogen has been stored in a pressure-resistant vessel under a high pressure or stored as a cryogenic liquid, being cooled to an extremely low temperature. However, said storage methods have revealed some drawbacks that: transfer is very difficult, since the hydrogen is stored in a large-sized vessel; amount of hydrogen stored in a vessel is limited, due to low density of hydrogen; and, heat is required to release hydrogen to the outside.

On the other hand, several metals and alloys have been known to permit reversible storage and release of hydrogen. In this regard, they have been considered as a superior hydrogen-storage material, due to their high hydrogen-storage efficiency. Solid-phase metal or alloy system can store large amounts of hydrogen by absorbing hydrogen with a high density and by forming a metal hydride under a specific temperature and pressure or an electrochemical conditions, and hydrogen can be released by changing the said conditions. The metal hydride has an advantage of high-density hydrogen-storage for a long time, since it is formed by the intrusion of hydrogen atoms to the crystal lattice of a metal.

In general, hydrogen-storage alloy system must have a hydrogenation characteristics such as a proper plateau pressure, high hydrogen-storage capacity and hydriding rate, and long cycle-life. A variety of metallic materials for hydrogen-storage to meet the said requirements have been proposed in the art, e.g., Mg, Mg-Ni, Mg-Cu, Ti-Fe, Ti-Ni, R-Ni and R-Co alloy systems(wherein, R is a rare-earth metal).

Of these metals, Mg alloy system, though it can store a relatively large amounts of hydrogen per unit weight of the storage material, heat energy should be supplied to release hydrogen stored in the alloy, owing to its low hydrogen dissociation equilibrium pressure at room temperature. Moreover, release of hydrogen can be made over a long time, only under a high temperature of over 250° C. along with the consumption of large amounts of energy.

On the other hand, rare-earth metal alloy, has demerits that hydrogen-storage capacity per unit weight is lower than any other hydrogen-storage material and it is very expensive, though it can efficiently absorb and release hydrogen at room temperature, grounded that it has the hydrogen dissociation equilibrium pressure in the order of several atmospheric pressures at room temperature.

Ti-Fe alloy system which has been considered as a typical and superior material of the titanium alloy systems, has the advantages that it is relatively inexpensive and the hydrogen dissociation equilibrium pressure of hydrogen is several atmospheric pressure at room temperature. However, since it requires a high temperature of about 350° C. and a high pressure of over 30 atms for initial hydrogenation, the alloy system provides relatively low hydrogen absorption/desorption rate and it has a hysteresis thereof, finally to hinder the complete release of hydrogen stored therein.

Under the circumstances, a variety of approaches have been made to solve the problems of the prior art and to develop an improved material which has a high hydrogen-storage efficiency, a proper hydrogen dissociation equilibrium pressure and a high absorption/desorption rate.

In this regard, Ti-Mn alloy system has been reported to have a high hydrogen-storage efficiency and a proper hydrogen dissociation equilibrium pressure, since it has a high affinity for hydrogen and low atomic weight to allow large amounts of hydrogen-storage per unit weight.

In specific, $Ti_{0.9}Zr_{0.1}Mn_{1.4}V_{0.2}Cr_{0.4}$ alloy system which has a hydrogen-storage capacity of 1.94 wt % and a dissociation pressure of 8 to 10 atm at 20° C., has been suggested as a superior hydrogen-storage alloy(see: T. Gamo et al, Int. J. Hydrogen Energy, 10(1):39–47(1985)). However, said alloy system does not reach a stage of practical application in the art, since it has still low hydrogen-storage capacity.

SUMMARY OF THE INVENTION

In accordance with the present invention, it has been discovered that: Ti-Mn alloy system of the invention has a high hydrogen-storage capacity, a proper hydrogen dissociation equilibrium pressure and high absorption/desorption rate.

A primary object of the present invention is, therefore, to provide an improved hydrogen-storage material employing Ti-Mn alloy system, which has a high hydrogen-storage capacity, a proper hydrogen dissociation equilibrium pressure and high absorption/desorption rate.

BRIEF DESCRIPTION OF DRAWINGS

The above and the other objects and features of the present invention will become apparent from the following descriptions given in conjunction with the accompanying drawings, in which.

DETAILED DESCRIPTION OF THE INVENTION

Ti-Mn alloy system for hydrogen-storage of the invention which has a C14 crystal structure, is represented as:

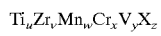

wherein,
X is at least one of element selected from the group consisting of Fe, Al and Ni;
u, v, w, x, y and z are mole numbers of each components;
$0.7 < u < 1.0$; $0 < v < 0.3$; $1.0 \leq w \leq 1.3$; $0.1 \leq x \leq 0.4$;

$0 < y < 0.3$; $0 \leq z \leq 0.2$; $0.7 < u+v < 1.0$; $1.4 \leq w+x \leq 1.7$; and, $1.3 \leq w+x+y+z < 2.0$.

The Ti-Mn alloy of the invention is prepared by: pouring metal components of over 99% purity into a crucible, dissolving the metal components by arc under an argon environment to provide a homogeneous composition, and cooling the dissolved resultant to room temperature.

A preferred embodiment of the present invention is described in more detail accompanying with the drawings.

Figure 1:
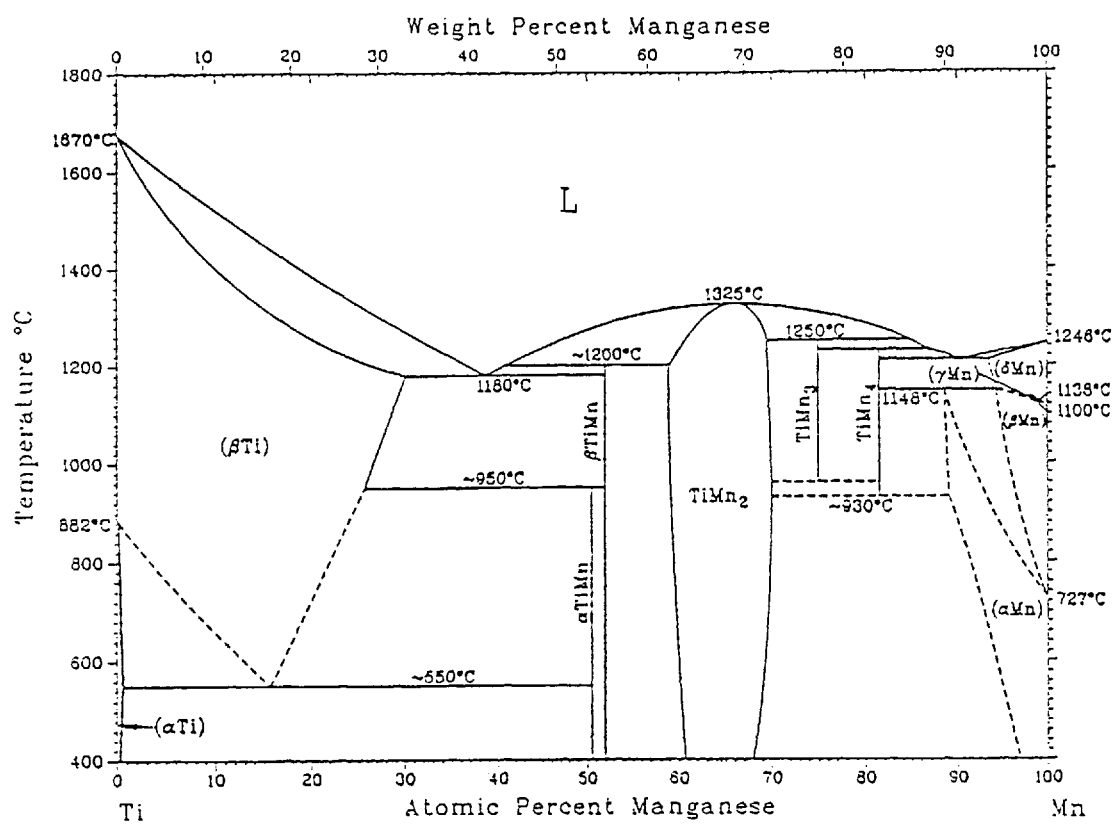
FIG. 1 is a phase-equilibrium diagram of Ti-Mn alloy system.

FIG. 1 is a phase-equilibrium diagram of Ti-Mn alloy system. As can be seen in FIG. 1, it is clearly determined that Ti-Mn alloy system can form β-Ti of body centered cubic (BCC) structure, $TiMn_2$ having Laves phase of C14 hexagonal structure, α,β,γ,δ-Mn solid solution and intermetallic compound of $TiMn_3$ and $TiMn_2$. Of the above types of phases, β-Ti and $TiMn_2$ alloys can absorb and desorb hydrogen by the reaction with hydrogen: the former has a disadvantage of low hydrogen desorption due to a high affinity for hydrogen at room temperature, while the latter has a wide range of composition creating a phase homogeniety, is able to give a hydrogen-storage alloy by the substitution of elements and change of their composition. However, $TiMn_2$ alloy has been proven to have a poor hydrogen-storage property, due to the extremely high pressure of 100 atms which permits absorption and desorption of hydrogen at room temperature (see: S. N. Klyamkin et al, J. Alloys and Compounds, 205:L1–L2 (1994)).

Figure 2:
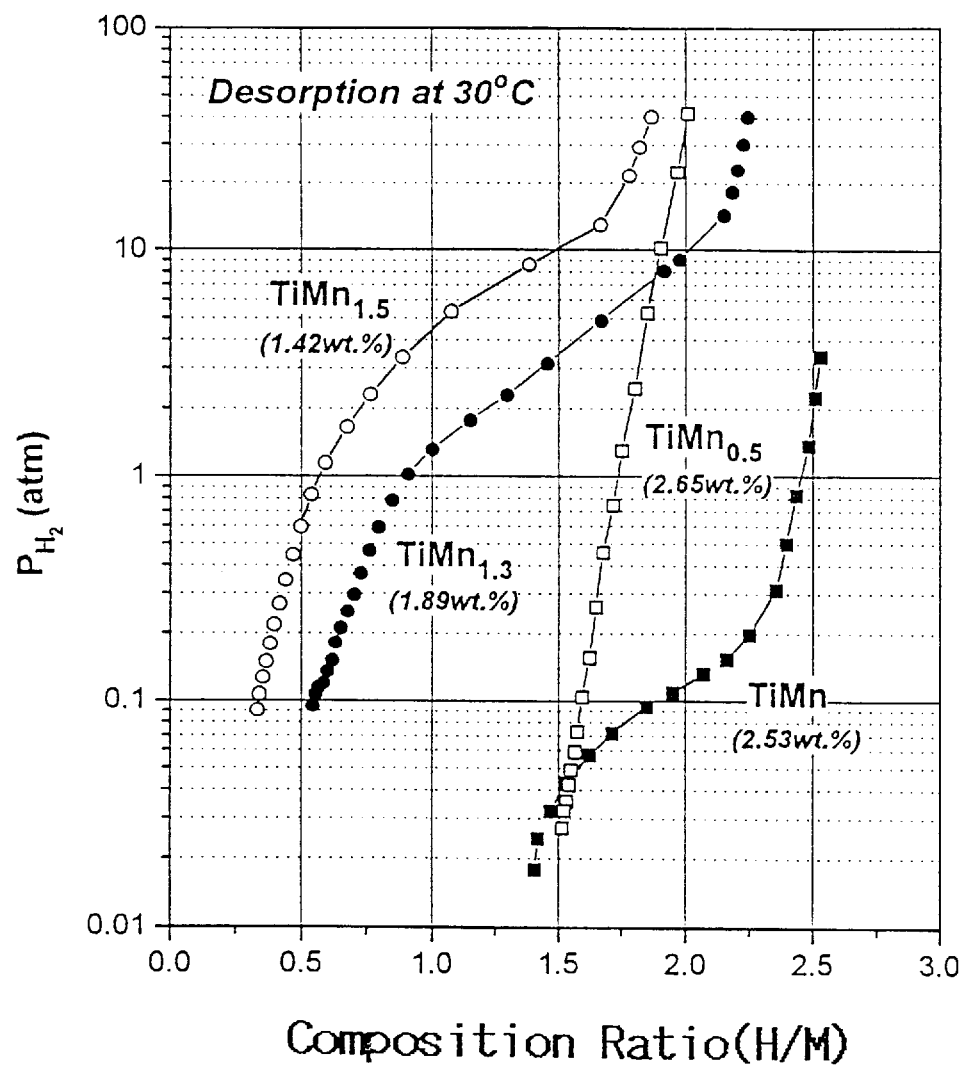
FIG. 2 is a P-C-T curve for $TiMn_x$ alloy system which are of different composition of Mn.

FIG. 2 is a P-C-T(pressure-composition-temperature) curve for various Ti-Mn alloys which are of different compositions of Mn(i.e., x=0.5, 1.0, 1.3, 1.5) in $TiMn_x$ alloy system desorbed at a temperature of 30° C. As can be seen in FIG. 2, it is clear that the hydrogen-storage capacity becomes higher to have a value of 1.42 wt %, 1.89 wt %, 2.53 wt % and 2.65 wt % while the equilibrium pressure becomes lower, as the composition ratio of Mn is getting lower to have a value of 1.5, 1.3 1.0 and 0.5.

Figure 3:
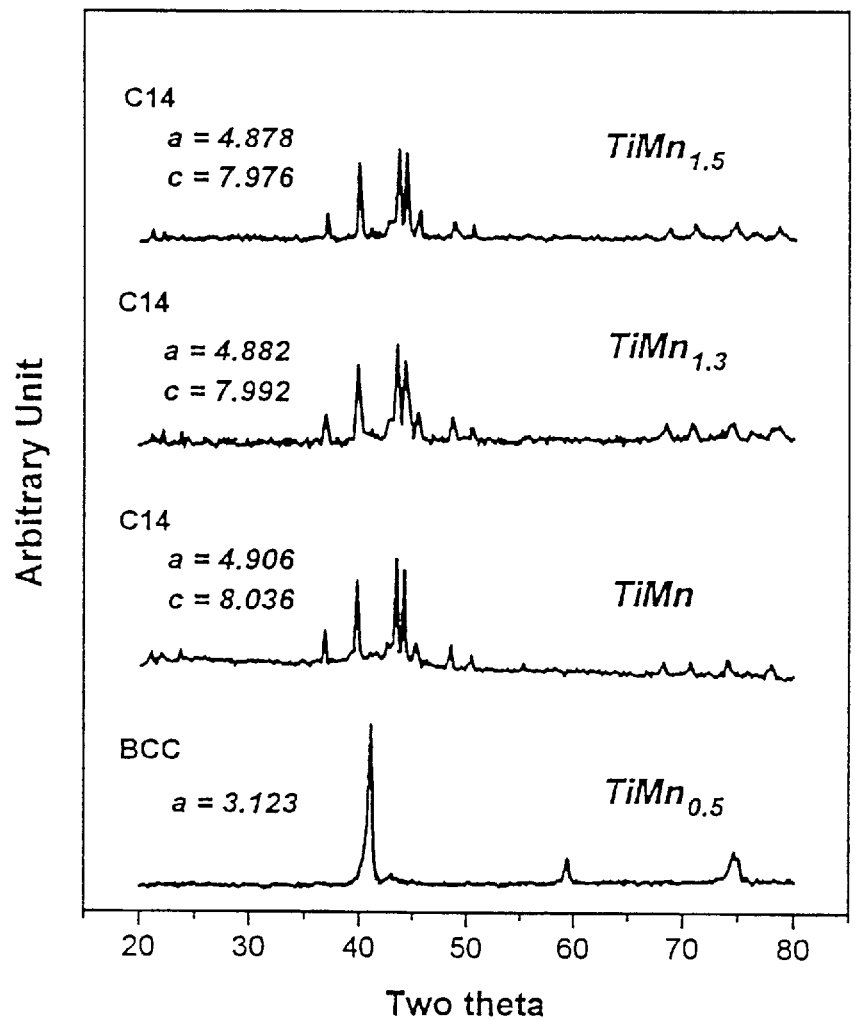
FIG. 3 is X-ray diffraction pattern for the $TiMn_x$ alloy systems which are of different composition Mn.

FIGS. 3 is x-ray diffraction pattern for the $TiMn_x$ alloy systems which are of different compositions of Mn. As can be seen in the FIG. 3, the crystal lattice parameters a and c of $TiMn_x$ alloy system are increased, while a C14 crystal structure is maintained, in the case that composition of Mn x is 1.5, 1.3 and 1.0, respectively; however, $TiMn_{0.5}$ alloy, though it has a high hydrogen-storage capacity of 2.65 wt %, has β-Ti phase which is a stable hydride to change C14 crystal structure of Laves phase to a crystal structure of BBC, finally to lower the reversible hydrogen-storage capacity.

Based on the above results, a portion of Ti and Mn in $TiMn_{1.5}$ and $TiMn_{1.3}$ alloy which absorb relatively large amounts of hydrogen and have a proper equilibrium pressure, have been substituted by other elements: substitution of Zr which has a high affinity for hydrogen for Ti and substitution of Cr, V, Fe, Al or Ni for Mn were carried out to prepare alloys and hydrogenation characteristics thereofs were examined.

Figure 4:
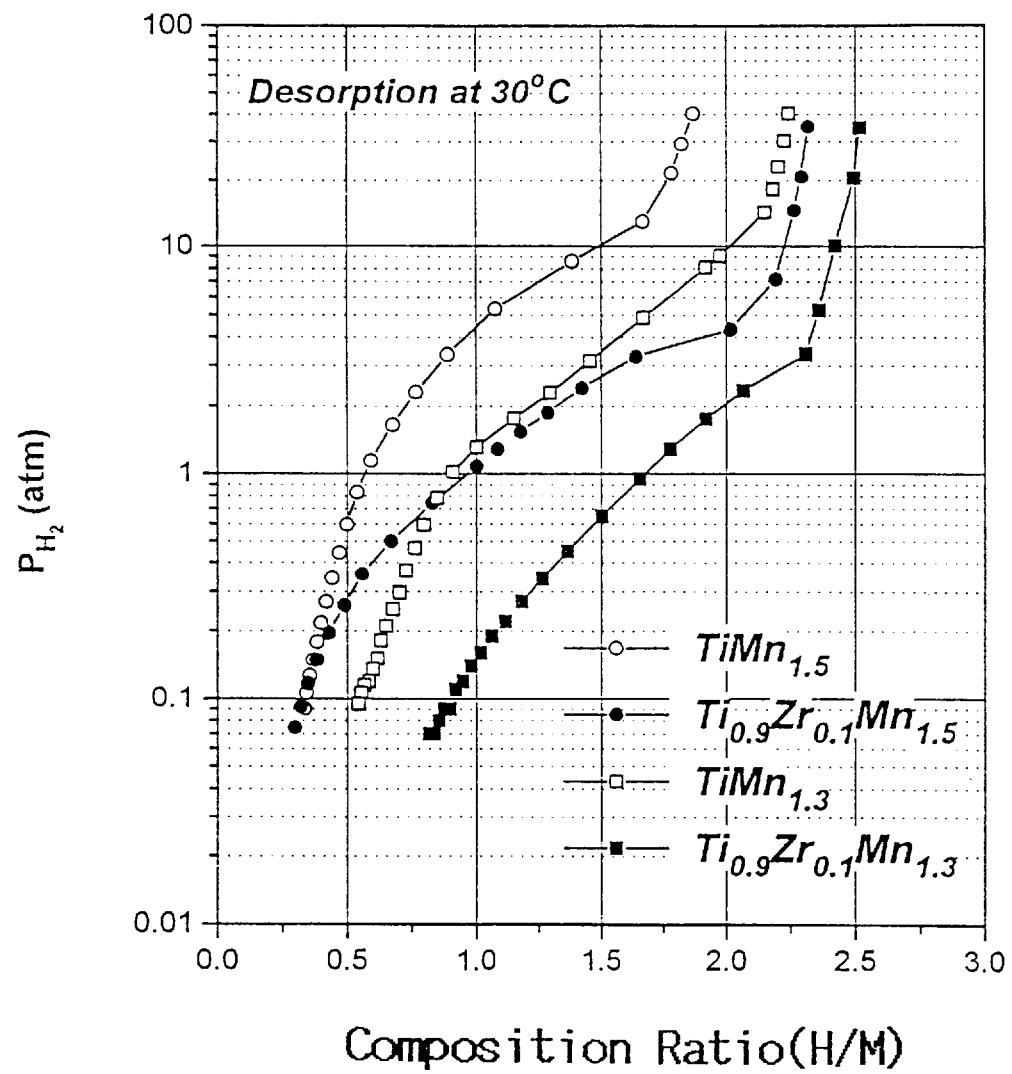
FIG. 4 is a P-C-T curve for an alloy prepared by the substitution of Zr for Ti in Ti-Mn alloy system.

FIG. 4 is a P-C-T curve for an alloy prepared by the substitution of Zr for a portion of Ti in Ti-Mn alloy system, where desorption was made at 30+ C. As can be seen in FIG. 4, where Zr is substituted for Tn, the hydrogen-storage capacity is increased from 1.42 wt % to 1.75 wt % in a case of $TiMn_{1.5}$ and from 1.89 wt % to 2.02 wt % in a case of $TiMn_{1.2}$, while the equilibrium pressure is decreased.

Figure 5:
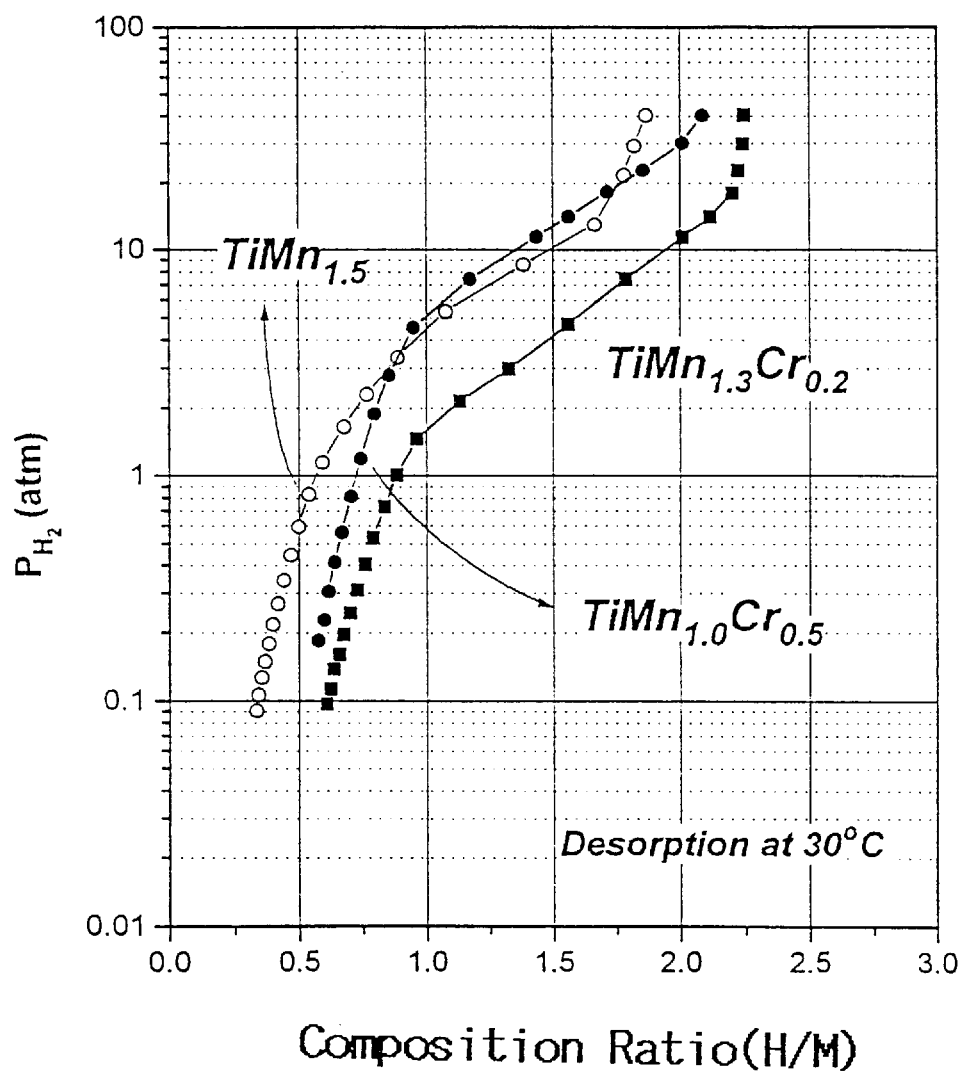
FIG. 5 is a P-C-T curve for an alloy prepared by the substitution of Cr for Mn in $TiMn_{1.5}$ alloy system.

FIG. 5 is a P-C-T curve for an alloy prepared by the substitution of Cr for a portion of Mn in Ti-$Mn_{1.5}$ alloy system at 30+ C. As can be seen in FIG. 5, in a case that mole number of substituted Cr is 0.2, the hydrogen-storage capacity is increased while hydrogen dissociation equilibrium pressure is constant, in a case that mole number is 0.5, it is similar to that of $TiMn_{1.3}Cr_{0.2}$ while the hydrogen dissociation equilibrium pressure is increased.

Figure 6:
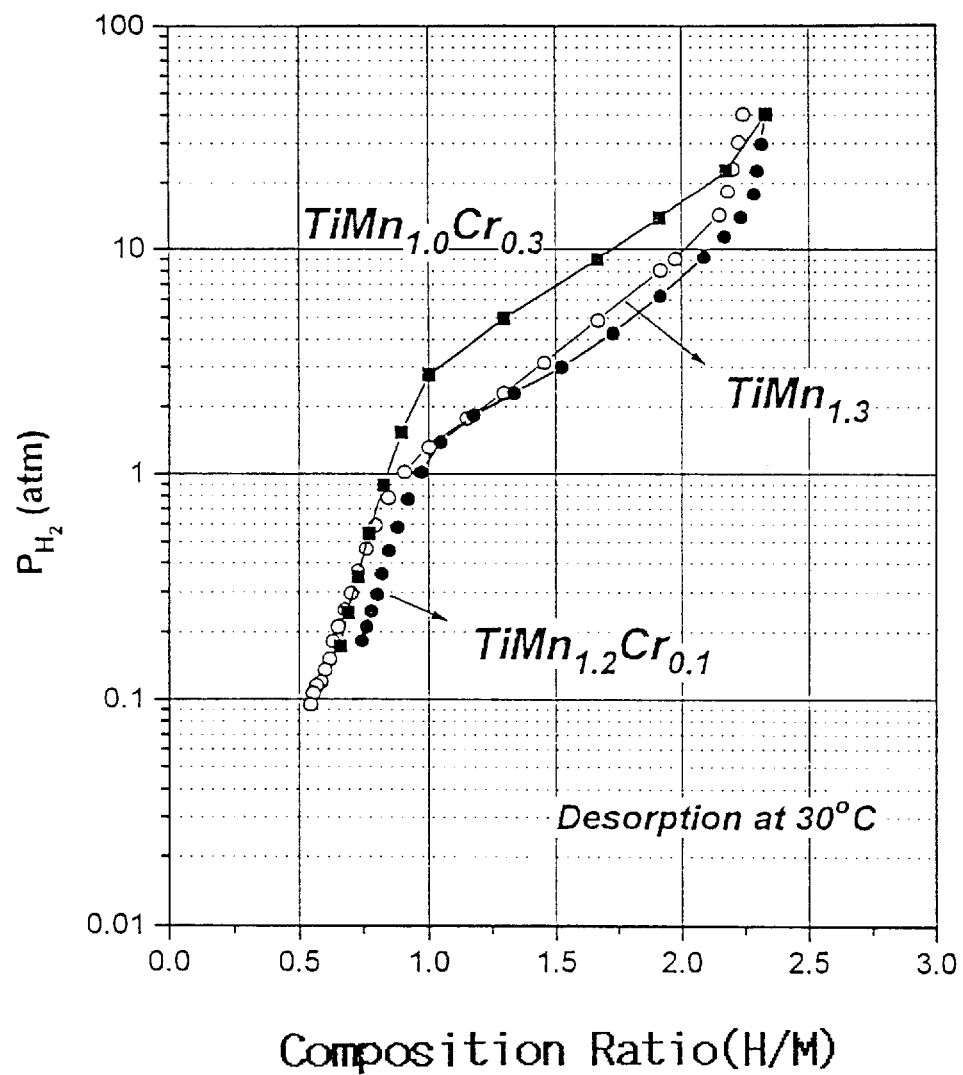
FIG. 6 is a P-C-T curve for an alloy prepared by the substitution of Cr for Mn in $TiMn_{1.3}$ alloy system.

FIG. 6 is a P-C-T curve for an alloy prepared by the substitution of Cr for a portion of Mn in Ti-$Mn_{1.3}$ alloy system at 30+ C. AS can be seen in FIG. 6, the substitution effect of Cr in $TiMn_{1.3}$ alloy system is similar to $TiMn_{1.5}$ alloy system of FIG. 5.

Figure 7:
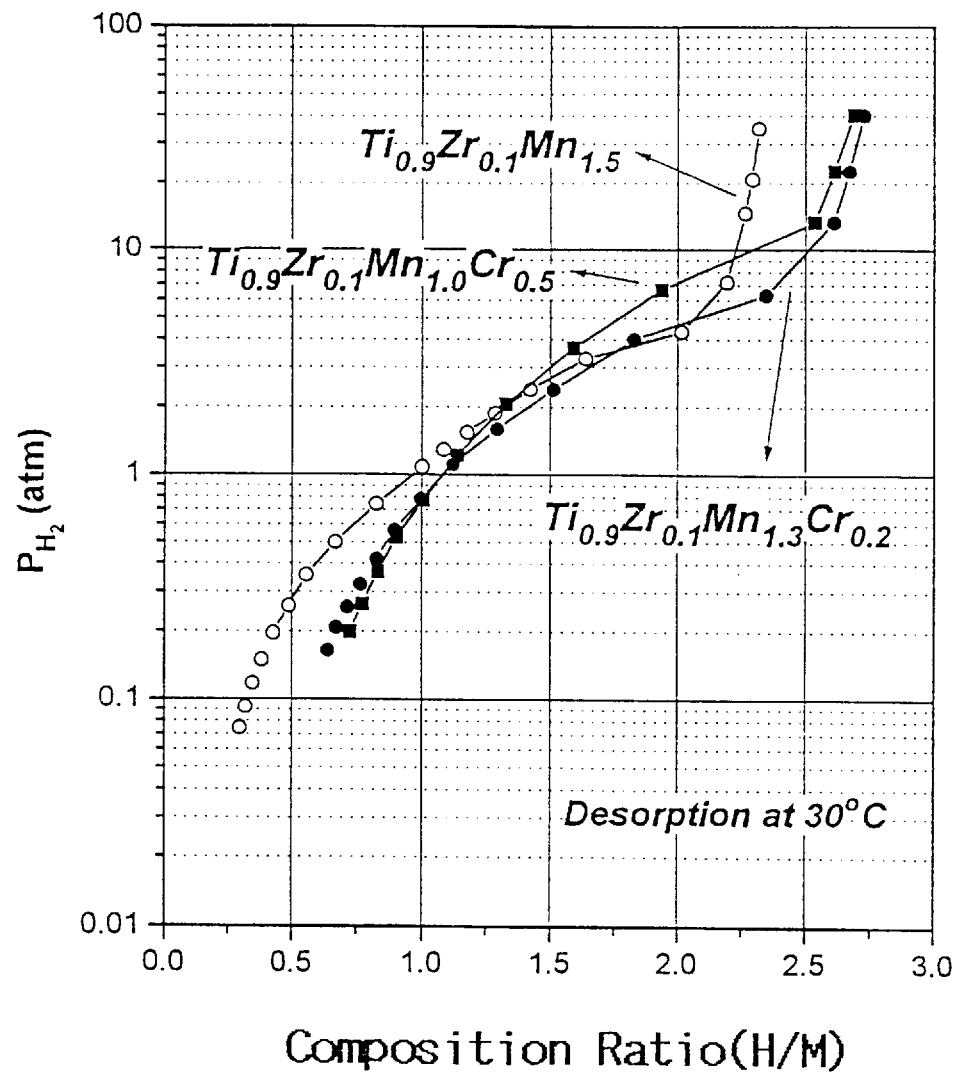
FIG. 7 is a P-C-T curve for an alloy prepared by the substitution of Cr for Mn in $Ti_{0.9}Zr_{0.1}Mn_{1.3}$ alloy system.

Based on the above results, the substitution effects of Zr and Cr in Ti-Mn alloy system were examined. FIG. 7 is a P-C-T curve for an alloy prepared by the substitution of Cr for a portion of Mn in $Ti_{0.9}Zr_{0.1}Mn_{1.5}$ alloy system at 30° C. As can be seen in FIG. 7, the substitution of Cr for a portion of Mn in $Ti_{0.9}Zr_{0.1}Mn_{1.5}$ alloy system allows the increase in the hydrogen-storage capacity and hydrogen dissociation equilibrium pressure, which is similar to the effect of substitution of Cr in Ti-Mn alloy system.

Figure 8:
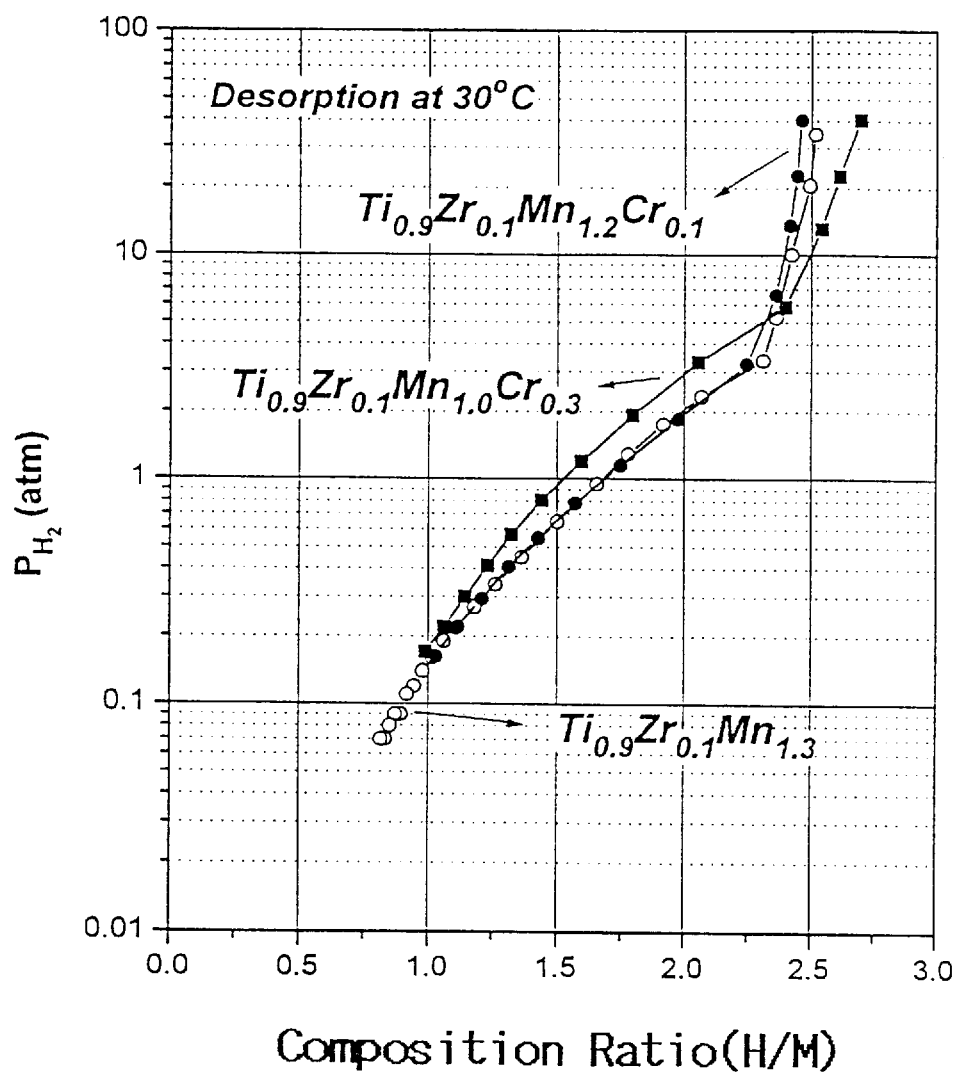

FIG. 8 is a P-C-T curve for an alloy prepared by the substitution of Cr for ;a portion of Mn in $Ti_{0.9}Zr_{0.1}Mn_{1.3}$ alloy system at 30° C. As can be seen in FIG. 8, the effect of substitution of Cr in $Ti_{0.9}Zr_{0.1}Mn_{1.3}$ alloy system is similar to the case of $Ti_{0.9}Zr_{0.1}Mn_{1.5}$ alloy system shown in FIG. 7.

From the results of FIGS. 7 and 8, it is clearly determined that the effect of substitution of Cr and Zr on the hydrogen-storage capacity and hydrogen dissociation equilibrium pressure in $TiMn_{1.5}$ alloy system is maximized, as compared with the results of $TiMn_{1.3}$ alloy system. Accordingly, substitution of Cr and Zr in $TiMn_x$ alloy system(where, x is over 1.5) was carried out to prepare a hydrogen-storage alloy having a hypostoichiometric composition, and the effect of the substitution on the hydrogen-storage capacity and hydrogen dissociation equilibrium pressure were examined.

Figure 9:
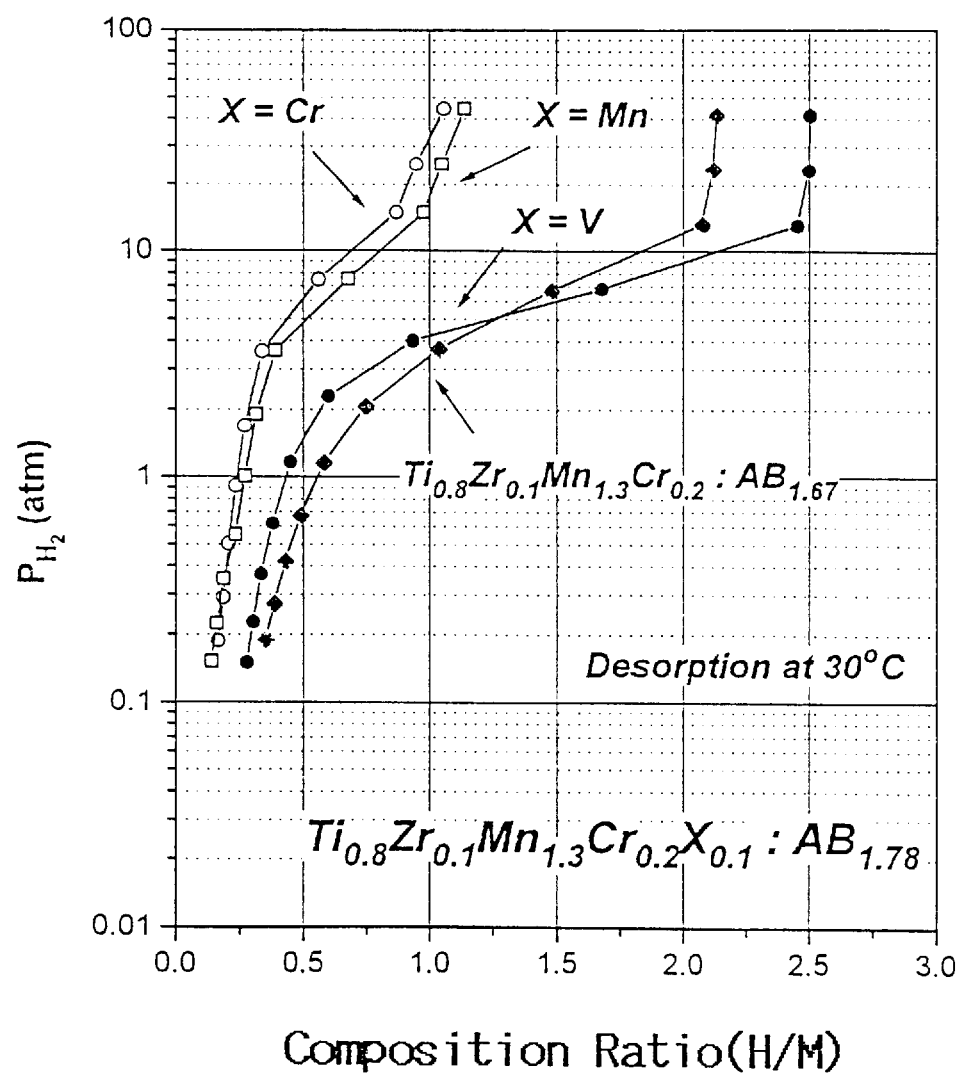
FIG. 9 is a P-C-T curve for $Ti_{0.9}Zr_{0.1}Mn_{1.2}Cr_{0.2}V_{0.1}Fe_{0.1}$ alloy system of the present invention.

FIG. 9 is a P-C-T curve for $Ti_{0.9}Zr_{0.1}Mn_{1.3}Cr_{0.2}X_{0.1}$ alloy system having a stoichiometric composition of $AB_{1.78}$ (where, x is Mn, Cr or V) at 30° C. As can be seen in FIG. 9, $Ti_{0.8}Zr_{0.1}Mn_{1.3}Cr_{0.2}V_{0.1}$ alloy prepared by the substitution of X by V has a high hydrogen-storage capacity of 1.94 wt % and a plateau hydrogen dissociation equilibrium pressure to provide superior hydrogen characteristics.

Figure 10:
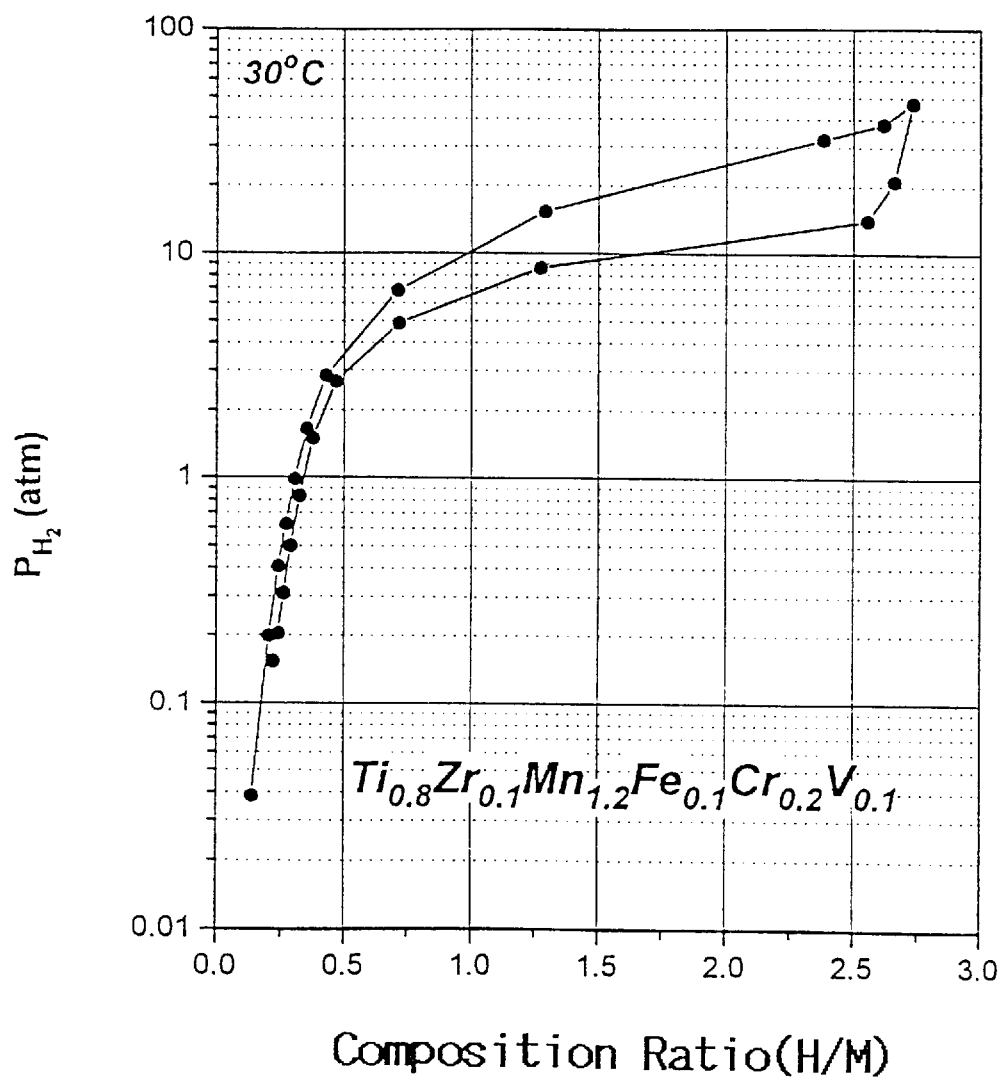

Based on the above results, $Ti_uZr_vMn_wCr_xV_yX_z$ of the invention was prepared. FIG. 10 is a P-C-T curve for $Ti_{0.8}Zr_{0.1}Mn_{1.2}Cr_{0.2}V_{0.1}Fe_{0.1}$ alloy system prepared by the substitution of a portion of Mn by Fe, which shows absorption/desorption of hydrogen at 30° C. As can be seen in FIG. 10, it is determined that the hydrogen-storage alloy has a high hydrogen-storage capacity of 2.03 wt % and extremely broad equilibrium pressure range.

As clearly illustrated and demonstrated as aboves, the present invention provides a material for hydrogen-storage constituted by Ti-Mn alloy system which has a high hydrogen-storage capacity, plateau hydrogen dissociation equilibrium pressure, hypostoichiometric composition and crystal structure of C14.

What is claimed is:

1. An alloy capable of storing hydrogen, wherein said alloy has a C14 crystal structure which is represented as:

$$Ti_uZr_vMn_wCr_xV_yX_z$$

wherein,

X is at least one of element selected from the group consisting of Fe, Al and Ni;

u, v, w, x, y and z are mole numbers of each components; $0.7 < u < 1.0$; $0 < v < 0.3$; $1.0 \leq w \leq 1.3$; $0.1 \leq x \leq 0.4$; $0 < y < 0.3$; $0 < z \leq 0.2$; $0.7 < u+v < 1.0$; $1.4 \leq w+x \leq 1.7$; and, $1.3 \leq w+x+y+z < 2.0$.

2. The alloy of claim 1, wherein X is Fe.

3. The alloy of claim 2 having the formula:

$Ti_{0.8}Zr_{0.1}Mn_{1.2}Cr_{0.2}V_{0.1}Fe_{0.1}$.

4. An alloy capable of storing hydrogen, wherein said alloy has a C14 crystal structure which is represented as $Ti_{0.8}Zr_{0.1}Mn_{1.3}Cr_{0.2}V_{0.1}$.

* * * * *

UNITED STATES PATENT AND TRADEMARK OFFICE
CERTIFICATE OF CORRECTION

| | |
|---|---|
| PATENT NO. | : 5,888,317 |
| DATED | : March 30, 1999 |
| INVENTOR(S) | : Jai-Young Lee et al. |

It is certified that error appears in the above-identified patent and that said Letters Patent is hereby corrected as shown below:

Title page,
Item [22] Filing Date, "April 30, 1996 should be -- April 29, 1996 --.

Signed and Sealed this

Twenty-third Day of October, 2001

Attest:

*Nicholas P. Godici*

NICHOLAS P. GODICI
*Attesting Officer*     *Acting Director of the United States Patent and Trademark Office*